United States Patent
Jelinek et al.

[15] 3,657,640
[45] Apr. 18, 1972

[54] GLASS CONDUCTIVITY AND TEMPERATURE PROBE

[72] Inventors: James W. Jelinek, Lancaster, Ohio; Joseph J. Kozlowski; Jack E. Gooding, both of Muncie, Ind.

[73] Assignee: Ball Corporation, Muncie, Ind.

[22] Filed: Feb. 5, 1969

[21] Appl. No.: 796,682

[52] U.S. Cl..............................324/30 R, 73/344, 324/30 A, 324/65 P
[51] Int. Cl....................................G01r 27/42, G01r 27/02
[58] Field of Search..............324/30, 65, 65 P, 119; 73/343, 73/343.5, 344

[56] References Cited

UNITED STATES PATENTS

| | | | |
|---|---|---|---|
| 2,328,853 | 9/1943 | Sherrard | 324/65 X |
| 2,526,636 | 10/1950 | Colman | 324/30 X |
| 3,152,303 | 10/1964 | Lary et al. | 324/65 X |
| 3,209,249 | 9/1965 | Warfield | 324/65 X |
| 3,302,102 | 1/1967 | Lace | 324/65 X |
| 1,287,970 | 12/1918 | Greinacher et al. | 324/119 X |
| 1,715,446 | 6/1929 | Bossart | 324/119 X |
| 3,278,844 | 10/1966 | Bell et al. | 324/65 |

OTHER PUBLICATIONS

Rosenthal, R., Solution Conductivity Measurement; Instruments; Vol. 23; No. 7; July 1950; pp. 664-669.

Primary Examiner—Rudolph V. Rolinec
Assistant Examiner—Ernest F. Karlsen
Attorney—Campbell, Harris & O'Rourke

[57] ABSTRACT

A device for measuring the conductivity and/or temperature of glass in molten state. A probe including a hollow elongated member of nonconductive material has a pair of spaced external bands of conductive material near one end with an internal lead from each band extending to the other end of the elongated member. The leads are connected with power input means and an AC to DC converter, the latter of which is connected with a voltage readout to supply direct voltages thereto which are indicative of the conductivity of the molten glass between the bands on the probe. In addition, a thermocouple is positioned within the elongated member at the end with the bands thereon with leads therefrom being connected with a temperature readout that is externally positioned with respect to the probe.

4 Claims, 4 Drawing Figures

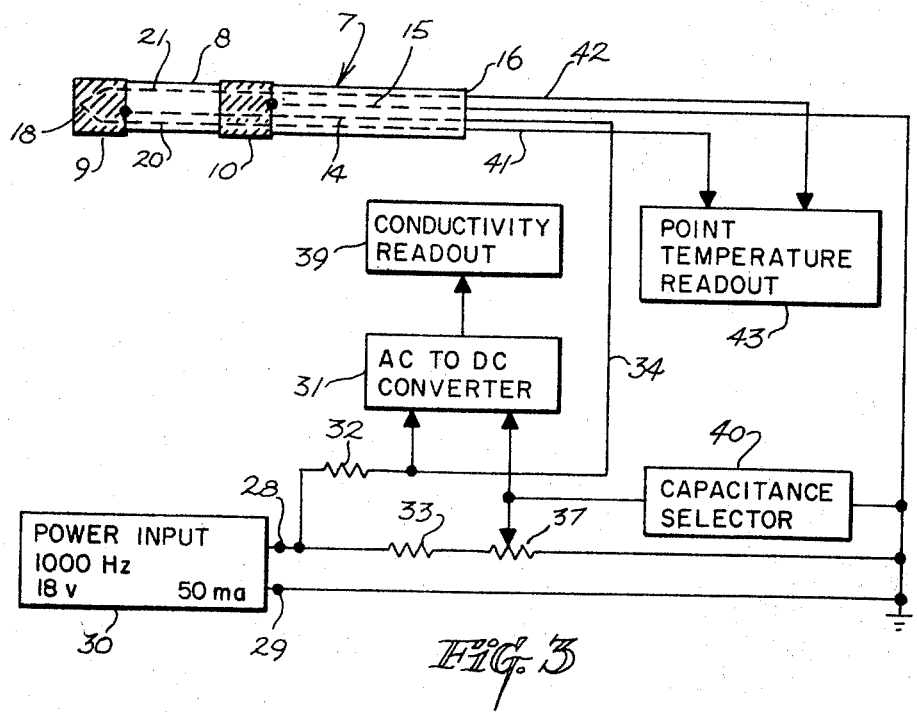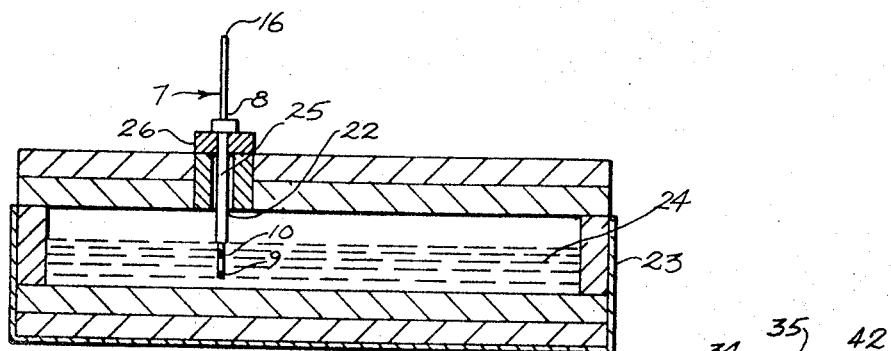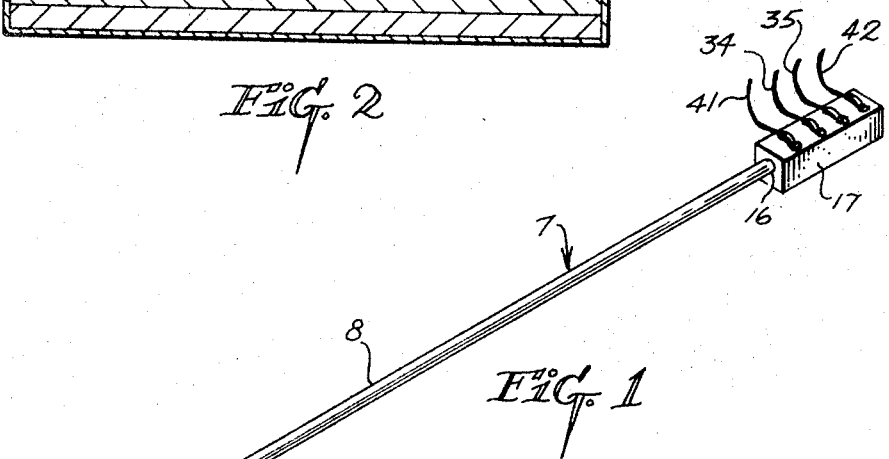

INVENTORS
JAMES W. JELINEK
JOSEPH J. KOZLOWSKI
JACK E. GOODING
BY Campbell, Harris & O'Rourke
ATTORNEYS

GLASS CONDUCTIVITY AND TEMPERATURE PROBE

BACKGROUND OF THE INVENTION

1. Field of the Invention

This invention relates to a glass conductivity and temperature probe and, more particularly, relates to a device for measuring the viscosity of glass in molten state.

2. Description of the Prior Art

It is oftentimes desirable to measure the conductivity of molten glass. Such measurement can be used to good advantage, for example, as a process control in glassware manufacturing operations such as by measuring the conductivity of molten glass in a forehearth to thereby monitor one or more properties of the glass. When conductivity and temperature are both monitored, then glass viscosity can be monitored, since conductivity and temperature are related to glass viscosity. In addition to serving as a process control link, such a device can also be utilized as an early warning system to detect such things as errors in glass batch formulations.

While devices have been known and/or utilized previously to determine conductivity or resistivity of molten glass as well as to determine the temperature of such glass, these devices have not proved to be completely successful for all purposes. In some of the devices taught by the prior art, for example, separate pairs of electrodes have commonly been required, with one set being connected with the power supply and the other set being connected with readout equipment in order to measure conductivity. In other prior art devices, difficulty has been experienced because of the inability of the device to handle a sufficient range of temperature encountered, due, at least in part, to a lack of sufficient circuitry for accurate conductivity readout which, for example, can be caused by phase shifts due to the changed capacitance of the probe under varying conditions. In addition, still other devices have proved to be so unwieldly or complicated that dependability and/or versatility were sacrificed.

SUMMARY OF THE INVENTION

This invention provides an improved device for measuring the conductivity of glass in molten state wherein a probe having metallic bands thereon is utilized as a conductivity measuring cell, with this cell being connectable to both a power supply and a readout device. This invention also provides, as a part of the device, means for measuring the temperature of molten glass and a readout for the same so that the device is suitable for monitoring glass viscosity.

It is therefore an object of this invention to provide an improved device for measuring the conductivity of glass in molten state.

It is another object of this invention to provide an improved device for measuring both the conductivity and temperature of molten glass whereby the viscosity of said glass can be monitored.

It is another object of this invention to provide an improved measuring device having one pair of electrodes connectable with both a power supply and a readout device.

It is still another object of this invention to provide an improved device including a probe having bands thereon immersible in molten glass to measure the conductivity of said glass.

It is yet another object of this invention to provide an improved device for measuring the conductivity of molten glass including a probe with two electrodes thereon connectable with a power supply of predetermined frequency and voltage and to an AC to DC converter, the direct voltage output of which is indicative of the conductivity of said molten glass.

It is still another object of this invention to provide an improved conductivity measuring device having accurate readout.

It is yet another object of this invention to provide an improved conductivity measuring device having phase shift compensation circuitry whereby said readout is accurate over a broad range.

With these and other objects in view which will become apparent to one skilled in the art as the description proceeds, this invention resides in the novel construction, combination and arrangement of parts substantially as hereinafter described and more particularly defined by the appended claims, it being understood that such changes in the precise embodiment of the hereindisclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a perspective view of the probe of this invention;

FIG. 2 is an illustrative view showing the use of the probe of FIG. 1 immersed in molten glass;

FIG. 3 is a combined block diagram and probe electrical diagram of the device of this invention.

DESCRIPTION OF THE PREFERRED EMBODIMENT

Figure 4:
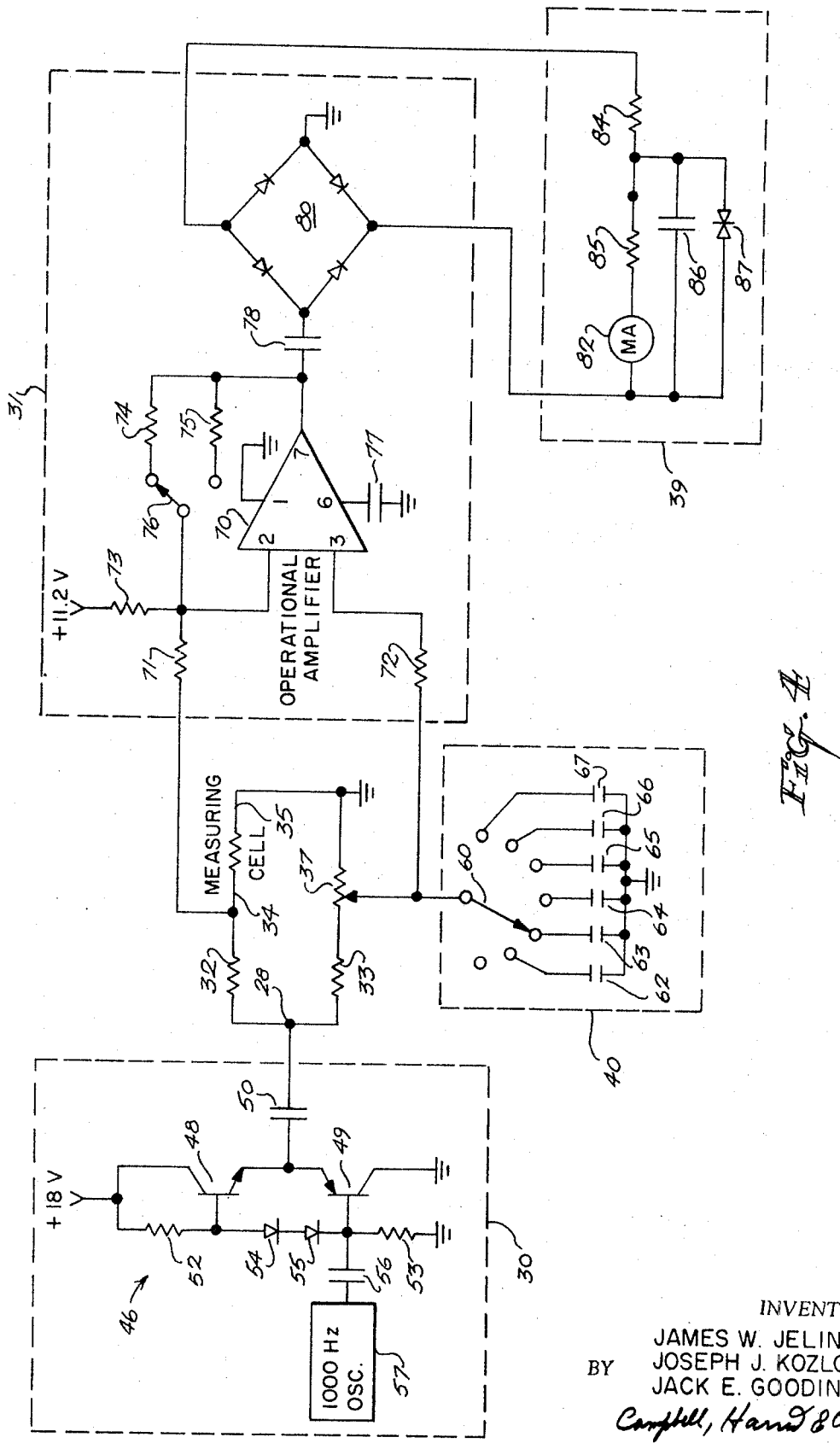
FIG. 4 is a schematic block and circuit diagram of the conductivity probe as shown in FIG. 3.

Referring now to the drawings, the numeral 7 indicates generally a probe suitable for immersion in molten glass. As shown best in FIG. 1, probe 7 includes an elongated member 8 of nonconductive material having a pair of bands 9 and 10 at one end thereof, said bands being of conductive material. With respect to lower band 9, it is to be noted, as shown in FIG. 1, that this band is preferably a cap which goes over the end of the probe.

While any electrically nonconductive material may be used, so long as the material will withstand the expected temperature of the molten glass, it has been found that recrystalized alumina can, for example, be utilized to good advantage. The bands 9 and 10 must be of electrically conductive material and while any such material suitable for withstanding the temperatures to be encountered may be utilized, it has been found that pure platinum can be used to good advantage.

Elongated member 8 of probe 7 is preferably of very small diameter so as not to interfere with the flow of molten glass and is preferably about one-fourth inch in diameter. The length of the elongated member will be dependent, of course, upon desired use. It has been found, however, than an elongated member about 18 inches in length can be used to good advantage. Metallic bands 9 and 10 are preferably spaced about one-half inch part to create a measuring cell between the two bands with a conductivity cell factor of about 0.486.

As shown in FIG. 3, the bands 9 and 10 are each connected with a different lead 14 and 15, which extend through the hollow elongated member 8 to the end 16 opposite the end with the bands where the leads preferably terminate at a junction block 17 as shown in FIG. 1. As also indicated in FIG. 3, the elongated member 8 may also have an internal thermocouple 18 at the end of the elongated member so as to be positioned within cap 9, with the two leads from the thermocouple being coupled by leads 20 and 21 to end 16 of the elongated member.

As shown in FIG. 2, the probe may be fastened or inserted through a suitable opening 22 in a molten glass retainer which may, for example, be a forehearth 23 through which molten glass 24 is flowing, so that the end of the probe with the bands thereon is immersed into the molten glass. For the probe, as shown in the drawing, it is only necessary that the probe be immersed into the glass a distance of about 2 inches. As also shown in FIG. 2, a sleeve 25 which may be of the same material as the elongated member 8 may be placed over the probe to give extra protection thereto. If the probe is to remain in the molten glass for any length of time, the probe is preferably fastened in place by fastening means 26, which can, for example, clamp the probe in position.

As shown in FIG. 3, power input terminals 28 and 29 are provided, which input terminals may be connected to power input 30. Power input 30 provides an AC signal having a frequency of 1,000 Hz. with an amplitude of about 18 volts peak-to-peak at about 50 milliamps.

The "K" factor of the measuring cell combined with the glass resistance results in a cell resistance of only a few ohms (less than 10 ohms). Since the resistance of the remaining bridge circuit is sufficiently high (several thousand ohms), changes in the cell resistance will not appreciably affect current flow. Current in the circuit can be considered constant as long as the applied voltage remains constant. The electrical resistance of the molten glass is then determined by the voltage drop across the measuring cell divided by the current in the circuit.

As shown in FIG. 3, power input terminal 28 is connected to the two inputs to an AC to DC converter 31 one connection being through resistor 32, and the other connection being through resistor 33 and variable resistor 37, resistor 32 having a value of 500 ohms, resistor 33 having a value of 2K ohms, and variable resistor 37 having a value of 0–50 ohms. AC to DC converter 31 is required to demodulate the 1,000 Hz. drop in order to determine the EMF of the measuring cell. It has been found that the normal range of cell voltage drop is between 100 and 500 millivolts peak-to-peak.

The junction of resistor 32 and one input to AC to DC converter 31 is connected by means of lead 34 to lead 14 from the probe (and thus is connected to cap 9). Lead 15 coming from band 10 of the probe is directly connected by means of lead 35 to power input 29 (grounded), and is connected to the end of variable resistor 37 opposite resistor 33 so that variable resistor 37 is used for adjustment of the readout for conductivity measurement.

As also shown in FIG. 3, the output from the AC to DC converter 31 is coupled to conductivity readout 39, which readout receives the direct voltage output from the AC to DC converter, and is indicative of the conductivity of glass measured by the measuring cell formed by bands 9 and 10. Readout 39 can be, for example, an ammeter, as shown in FIG. 4, or a recorder such as an Esterline Angus recorder having ranges from 1 millivolt upward.

The conductivity probe represents a complex cell when immersed in molten glass, the total reactance of which is dependent upon both resistance and capacitance which vary with the electrical conductivity of the glass. The changing capacitance of the measuring cell results in a change in electrical phase angle of the cell relative to the remainder of the bridge circuit made up of the measuring cell and resistors 32, 33 and 37. The changing phase angle, in turn, interferes with accurate conductivity measurement since a meter null point cannot be reached, which is a necessary prerequisite for accurate conductivity measurement. This problem has been overcome, however, by the addition of a capacitance selector 40 connected between ground and the movable contactor of variable resistor 37, as shown in FIG. 3. The purpose of this selector is to place additional capacitance in the circuit as needed, the added capacitance being unlike the capacitance of the probe due to the multiplication factor of the bridge circuit.

If a thermocouple is included in the probe, the leads 20 and 21 therefrom are connected through leads 41 and 42, respectively, to a point temperature readout 43, as also shown in FIG. 3. Readout 43 can be, for example, a PT — PT — 13 percent Rh temperature recorder.

In the embodiment as described herein, the glass measuring cell will exhibit a resistance of from about 0 to 6 ohms, and with this design, a glass temperature change of about 250° F. will cause a change of about 100 millivolts peak-to-peak, or 1 millivolt peak-to-peak per 2-½° F. It is also to be noted that the probe is not grounded electrically and will therefore prevent blistering of the glass.

As shown in FIG. 4, power input 30 includes a constant current generator 46 having a pair of transistors 48 and 49 the emitters of which are connected through a capacitor 50 to input terminal 28. The collector of transistor 48 is connected to a +18 volt power source (not shown) while the collector of transistor 49 is connected to ground. The base of transistor 48 is connected to the +18 volt power source (not shown) through resistor 52, while the base of transistor 49 is connected to ground through resistor 53, the bases of transistors 48 and 49 being connected together through diodes 54 and 55. The junction of the base of transistor 49, diode 55, and resistor 53 is also connected through capacitor 56 to a conventional oscillator 57 providing a 1,000 Hz. output signal. For purposes of illustration of particular components that can be utilized, transistor 48 can be a 2N1711, transistor 49 a 2N4037, capacitor 50 — 50 μFd, resistor 52 — 18K, resistor 53 — 15K, diodes 54 and 55 a 1N458, and capacitor 56 — 0.47 μFd.

Capacitance selector 40 includes a switch 60 the movable arm of which is connected to the movable arm of variable resistor 37. Switch 60 selects one of capacitors 62 through 67 (the other side of each of which is connected to ground) to make possible nulling of the meter for accurate conductivity readout. For purposes of illustration, capacitors 62 through 67 can be 0.47, 0.57, 0.68, 0.8, 0.9, and 1 μFd, respectively, with switch 60 selecting the proper one needed in each case for nulling purposes.

As also shown in FIG. 4, AC to DC converter 31 can include an operational amplifier 70, the AC input to which is coupled through resistors 71 and 72. In addition, the junction of resistor 71 and one input (2 as designated in FIG. 4) is connected with a +11.2 volt power supply (not shown) through resistor 73, with the amplifier output (7 as designated in FIG. 4) being connected to resistor 73 through either resistor 74 (for multiplication by 1,000) or 75 (for multiplication by 100) as determined by switch 76. A capacitor 77 is also connected between pin 6 of amplifier 70 and ground. The output from the amplifier is coupled through capacitor 78 to a diode bridge 80 with the DC output from the bridge being coupled to conductivity readout 39. For purposes of illustration of particular components that can be utilized, operational amplifier 70 can be a μA—702, resistor 71 — 100 ohms, resistor 72 — 82 ohms, resistor 73 — 470K ohms, resistor 74 — 191K ohms, resistor 75 — 10K ohms, capacitor 77 — 1,000 μFd, capacitor 78 — 0.47 μFd, and each diode of diode bridge 80 a 1N281.

The input to a meter such as conductivity readout 39 is shown in FIG. 4. As shown, diode bridge 80 is connected at one side directly to a 0–50 ma ammeter 82, and at the other side of the meter through resistors 84 and 85. A capacitor 86 and meter protecting diode 87 are connected across meter 82 and resistor 85. For purposes of illustration of particular components that can be utilized, meter 82 can be a Simpson meter, resistor 84 — 18.5K ohms, resistor 85 — 6.8K ohms, capacitor 86 — 0.1 μFd, and diode 87 can be internal to the Simpson meter.

In operation, the probe is inserted into the molten glass and the power input means connected with the power source. The output from the measuring cell will then be converted by the AC to DC converter to a direct voltage output, which may then be read out or recorded, this output being a measure of the conductivity of the glass. With a thermocouple included, the temperature of the glass is also determined and may likewise be read out or recorded. By measuring both of these parameters, glass viscosity may be continuously monitored. Since the conductivity of the glass is also affected by glass batch formulation, monitoring for errors in the glass batch can also be achieved.

From the foregoing, it can be seen that this invention provides an improved device for measuring glass conductivity, as well as providing a device for continuous monitoring of glass viscosity.

What is claimed is:

1. A device for measuring the conductivity of glass in molten state, said device comprising: a probe having an elongated hollow body section of nonconductive material with first and second external bands of conductive material near one end spaced from one another, and first and second leads connected with said first and second bands, respectively, and extending therefrom to the other end of said body section of said probe; power input means adapted to be connected to a power source of predetermined voltage and frequency, said probe further including a thermocouple within said hollow body section near the end of said probe with said bands thereon, and further characterized by temperature readout means connected to receive the output from said thermocouple whereby glass viscosity is continuously monitored by continuous measurement of both the conductivity and temperature of said molten glass; an AC to DC converter with first and second inputs; first and second resistors connected with one of said power input means at one side and with said first and second inputs, respectively, of said AC to DC converter, said second resistor being a variable resistor; first circuit means connecting the junction of said first resistor and said one input of said AC to DC converter with said first lead of said probe; second circuit means for connecting the other side of said power input means with said second lead of said probe and with said second resistor, second circuit means also including variable capacitance means connected between said second lead of said probe and said second input of said AC to DC converter, said variable capacitance means including a plurality of capacitors and switching means for selectively connecting said capacitors in circuit; and readout means connected to receive the direct voltage output from said AC to DC converter, said readout means indicating conductivity as measured by said bands as a measuring cell when immersed in molten glass.

2. A device of claim 1 wherein said elongated hollow body section has a diameter no greater than about one-fourth inch and wherein said bands are spaced apart about one-half inch.

3. A device of claim 1 wherein said predetermined voltage is about 18 volts peak-to-peak and wherein said frequency is about 1,000 Hz.

4. A device of claim 1 wherein said bands and said resistors each form part of a bridge circuit.

* * * * *